May 20, 1958 W. A. McGAHAN 2,835,514
ROTARY SHAFT SEAL
Filed March 3, 1954
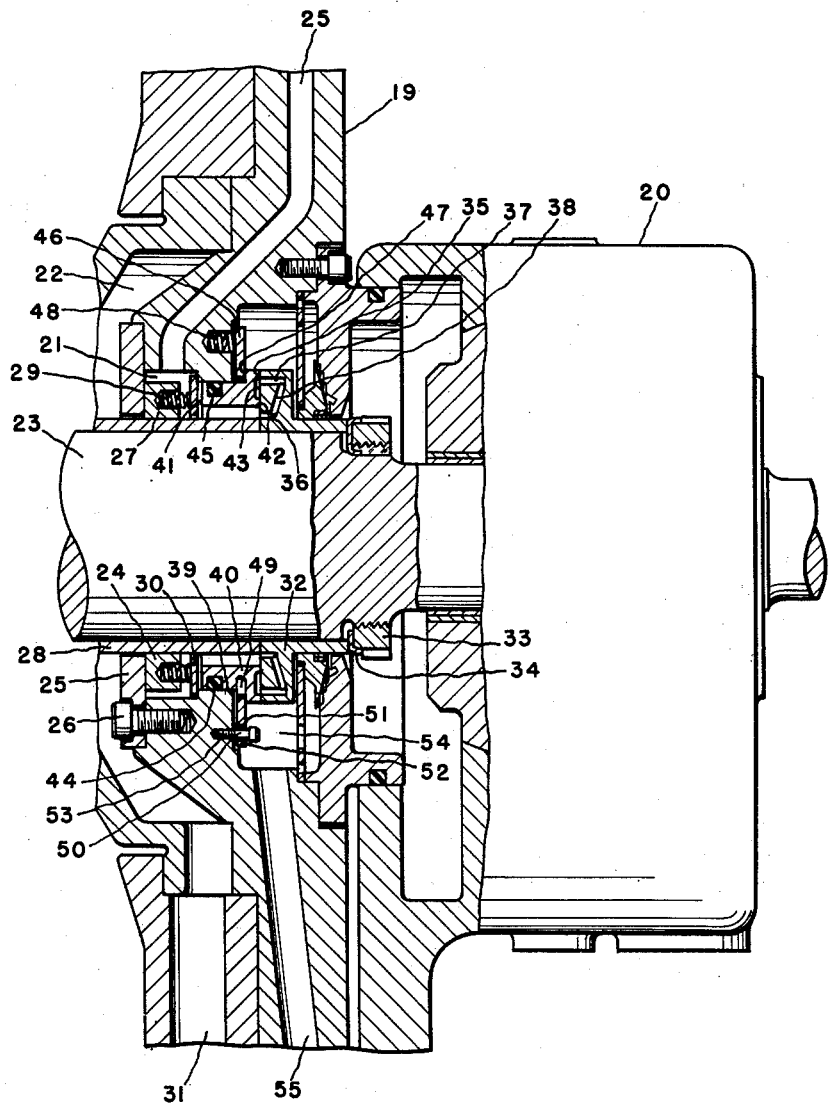
INVENTOR
WALLACE A. MC GAHAN
BY
HIS ATTORNEY

2,835,514

ROTARY SHAFT SEAL

Wallace A. McGahan, Phillipsburg, N. J., assignor to Ingersoll-Rand Company, New York, N. Y., a corporation of New Jersey Application March 3, 1954, Serial No. 413,932

4 Claims. (Cl. 286—9)

This invention relates to rotary shaft seals for centrifugal pumps and the like.

More particularly it pertains to mechanical seals for rotary shafts wherein sealing fluid is introduced between sealing surfaces on rotary and non-rotary components which cooperate to effect a seal.

One object is to effect a positive seal during operation of the pump by utilizing the high speed of the shaft to augment the pressure of a sealing fluid and introducing the fluid at the increased pressure between the sealing surfaces.

Another object is to eliminate the rubbing at high velocities between the sealing surfaces of the seal.

Another object is to provide a leak proof fluid seal by providing a combination of seals, a low pressure differential seal and a high pressure differential seal, arranged so that the low pressure seal is closer to the pump than the high pressure seal.

A further object is to provide the high pressure seal of said combination of seals with a drain for conducting sealing fluid to outside the pump in order to reduce leakage of sealing fluid into the pump to a minimum.

A further object is to assure a leak-proof seal when the pump is not in operation.

Another object is to maintain a seal at all times, irrespective of any lengthwise shifting of the shaft.

A further object of the invention is to provide a mechanical seal of simplified and compact construction that is easily serviced.

Other objects will be in part obvious and in part pointed out hereinafter.

The accompanying drawing illustrates a preferred embodiment of the invention in which the reference numerals refer to the respective parts.

The drawing is a side elevation, partly in section, of a portion of a centrifugal blower equipped with a sealing device constructed in accordance with the practice of the invention.

Referring to the drawing, the portion of the centrifugal blower shown includes a casing 19 on which is mounted a bearing 20 supporting a shaft 23 extending through chambers 21 and 22 in said casing. Chamber 22 is in communication with the discharge end of the blower and contains gas under discharge pressure which is higher than atmospheric. To prevent the leakage of gas along the shaft to the atmosphere, a sealing fluid such as oil is introduced into the chamber 21 at a pressure slightly in excess of the gas pressure and a seal is provided comprising a rotary member 32 having a sealing surface 35 and a non-rotatable member 40 axially slidable in casing 19 and having a sealing surface 42 for cooperating with the sealing surface 35 to effect a seal. The rotary member includes impelling means (passages 36, 37 and 38) for pumping the oil from the chamber 21 to the sealing surfaces 35 and 42 at increased pressure.

Sealing fluid such as oil is fed under pressure into the chamber 21 through a passage 25 in the casing 19. In order to prevent excessive leakage of sealing fluid from the chamber 21 into the chamber 22 a conventional seal 24 is mounted in the end of the chamber 21 adjacent to the chamber 22. The seal 24 shown consists of a stationary sealing plate 25 fastened to the casing 19 by means of several screws 26, a stationary annular sealing ring 27 encircling a spacer 28 on and rotatable with shaft 23 to effect a seal; the sealing ring 27 being urged into sealing engagement with the sealing plate 25 by means of several precompressed springs 29 held in place by an annular plate 30. Any leakage of oil occurring through the seal 24 is carried away through a drain passage 31. It is to be noted that, for reasons to be explained hereinafter, the inner diameter of the annular plate 30 is larger than the outer diameter of the spacer 28.

Positioned at the opposite end of the chamber 21 is the seal of the present invention consisting of a collar 32 encircling and rotatable with the shaft 23 and held in place together with the spacer 28 against a shoulder (not shown) on the shaft by a lock-nut 33 and a lock-washer 34. One end of the collar 32 constitutes a sealing surface 35 in which are located an inner annular groove 36 and an outer annular groove 37 concentric with the shaft. The grooves 36 and 37 are connected by a plurality of radial passages 38 within the collar, which construction acts as a centrifugal impeller. That is, oil entering the groove 36 is impelled by centifugal force along the passages 38 and into the groove 37 at a pressure in excess of the pressure in the chamber 21.

Encircling the shaft 23 and the spacer 28 and enclosed in a bore 39 in the casing 19 is a non-rotatable sleeve 40 axially slidable in the bore and having a pressure surface 41 on one end located in the chamber 21 and a sealing surface 42 on the other end for cooperating with the sealing surface 35. The sealing surface 42 contains an annular groove 43 which overlaps the outer groove 37 in the sealing surface 35, and serves as a collection chamber for distributing the oil between the sealing surfaces. The space formed between the sleeve 40 and the spacer 28 constitutes the portion of the chamber 21 adjacent to the atmosphere and is in communication with the inner groove 36 for supplying oil thereto. The portion of the chamber 21 adjacent to the discharge end of the blower is in communication with the portion of the chamber 21 adjacent to the atmosphere through the clearance formed between the annular plate 30 and the spacer 28. Oil is prevented from leaking along the periphery of the sleeve 40 to the atmosphere by a sealing ring 44 situated in an annular groove 45 on the periphery of the sleeve 40.

Encircling the sleeve 40 and bearing against a shoulder 47 thereon is a pusher plate 46, which is held in position by precompressed springs 48 contained in the casing 19. The pusher plate 46 and the sleeve 40 are held in fixed angular relation by a key 49 interposed therebetween. The pusher plate and the sleeve together are held non-rotatable by the machine screws 50, having a smooth portion 51 extending through clearance holes 52 in said pusher plate and a threaded portion 53 to engage the casing 19. The position of the screws is such as to allow free longitudinal movement of the sleeve and the pusher plate with respect to the shaft.

Surrounding the sleeve 40 and the collar 32 is an annular chamber 54 in the casing 19 for collecting the oil leaking through the sealing surfaces 35 and 42. Said oil is drained off through a passage 55.

During normal operation of the blower, oil is introduced into the portion of the chamber 21 adjacent to the discharge end of the blower at a pressure slightly in excess of the discharge gas pressure in chamber 22 and flows through the clearance formed between the annular plate 30 and the spacer 28 into the space formed between the sleeve 40 and the spacer 28. The oil is picked up by the collar 32 with its grooves 36 and 37 and passages 38 acting as a pressure booster, and introduced into the groove 43 at a considerable increase in pressure above that existing in the chamber 21. For example, a peripheral velocity of 200 feet per second at the groove 37 is not uncommon. At this speed and using oil as the sealing fluid, the pressure developed in the groove 37 is approximately 200 pounds per square inch in excess of the pressure in the groove 36.

This pressure developed by the impeller collar 32 acting on the surface 42 is sufficient to overcome the oppositely directed force of the springs 48 and the oil pressure in the chamber 21 acting against the pressure surface 41 on the sleeve 40, to push the sleeve away from the collar to the extent of permitting a limited amount of oil to flow both inwardly and outwardly between the sealing surfaces 35 and 42. The oil flowing inwardly between the sealing surfaces 35 and 42 reenters the chamber 21 to repeat the cycle just described. The oil flowing outwardly enters the chamber 54 and passes through the passage 55 to a sump (not shown) to be recirculated through the seal.

With this construction a liquid seal is maintained between the sealing surfaces at all times, independently of any fluctution of the oil pressure existing in the chamber 21. This ensures the prevention of any leakage of gas along the shaft 23, regardless of the effectiveness of the seal 24 in preventing leakage of gas into the chamber 21.

In the event of a reduction in oil pressure in the chamber 21 to a point less than the gas pressure during normal operation of the blower, the liquid seal above mentioned will exist for a sufficient length of time to allow an oil pressure switch (not shown) to shut down the blower.

In addition to the liquid seal thus created, the sealing surfaces 35 and 42 are held in a definite spaced relationship by the augmented oil pressure between them thereby eliminating the occurrence of any wear on these surfaces caused by the high rotary speeds common to blowers of this type. This is of prime importance, as the rate of wear and rise in oil temperature at these high speeds would be excessive, necessitating the frequent renewal of the collar 32 and the sleeve 40.

During a period of shutdown when the shaft 23 is stationary, the oil pressure in the groove 43 is the same as that in the chamber 21, so that the force exerted by the pressure of the springs 48 and the force of the oil pressure acting against the surface 41 on the sleeve 40 exceeds the force of the oil pressure acting against the groove 43, thereby pressing the sleeve against the collar 32 to effect a leak-tight joint and preventing any outward leakage of the gas to the atmosphere. In the event of oil failure during such a period of shutdown the spring force alone is great enough to maintain a leak-tight joint between the sealing surfaces. This is important not only for reasons of cost but particularly so where toxic or inflammable gases are being handled.

I claim:

1. In a sealing device for a pump, the combination of a casing having a chamber therein for sealing fluid under pressure, a rotary shaft extending through the chamber, a collar rotatable with the shaft and having a sealing surface thereon, a non-rotatable member movable longitudinally with respect to the collar, a sealing surface on the non-rotatable member adapted to engage the sealing surface on the collar to effect a seal, said collar having impelling means for pumping the sealing fluid at increased pressure from the chamber, means on the collar for conducting such fluid from the impelling means to between the sealing surfaces for providing a fluid seal, and spring means constantly tending to force the non-rotatable member into engagement with the collar.

2. A sealing device for a fluid pump having a casing with a chamber therein for sealing fluid under pressure in excess of the pressure of the fluid being pumped and a rotary shaft extending through the chamber, a collar member rotatable with the shaft and having a sealing surface thereon, a non-rotatable sleeve member in the casing encircling the shaft and slidable longitudinally with respect to said collar, a sealing surface on the sleeve adapted to seat against the collar sealing surface, impelling passages within the collar extending from a point on the collar in the chamber adjacent the shaft to a point on the collar sealing surface away from the shaft for pumping the sealing fluid at increased pressure from the chamber to between the sealing surfaces to provide a fluid seal, and spring means constantly urging the sleeve against the collar for controlling the flow of sealing fluid between the sealing surfaces during rotation of the shaft and for effecting a seal when the shaft is still.

3. A sealing device as claimed in claim 2 in which an annular groove is provided within the sealing surface of one of said members and positioned in alignment with the impelling passages extending to the point on such sealing surface away from the shaft to serve as a collection chamber for distributing the fluid between the sealing surfaces.

4. In a rotary shaft sealing device for fluid pumps having a casing with a chamber therein for sealing liquid under pressure in excess of the pressure of fluid in the pump, a rotary shaft extending through said chamber, an annular collar in the chamber and completely encircling the shaft and mounted on and rotatable thereby, said collar having a diameter slightly larger than said shaft and having a sealing surface thereon, an annular non-rotatable member mounted in said chamber and completely encircling the shaft and slidable longitudinally with respect to said shaft, a sealing surface on said annular non-rotatable member and adapted to seat against the sealing surface of the aforementioned collar, pump means consisting of at least one radial passage within said collar leading from the chamber at a point on said collar closely adjacent to the shaft to a point on the sealing surface of said collar spaced radially outward from the first said point for pumping sealing liquid by centrifugal force at increased pressure greatly in excess of the pressure in said chamber to between the sealing surfaces of said collar and said non-rotatable member to provide a liquid seal, means constantly urging the sealing surface of the non-rotatable member against the sealing surface of the collar to control the flow of sealing liquid between the sealing surfaces during rotation of said shaft and to form a contact seal when the shaft is not rotating, and means for draining sealing fluid leaking through said sealing surfaces, the last said means including a passage in the casing for conducting such leakage from the outer periphery of the seal to the outside of the casing, a portion of said passage encircling said collar and non-rotatable member and being separated thereby from the chamber.

References Cited in the file of this patent

UNITED STATES PATENTS

| | | |
|---|---|---|
| 1,575,970 | Carrier | Mar. 9, 1926 |
| 1,876,515 | Emmet | Sept. 6, 1932 |
| 1,903,210 | Carrier | Mar. 28, 1933 |
| 1,932,214 | Hornschuch | Oct. 24, 1933 |
| 2,077,038 | Carrier | Apr. 13, 1937 |
| 2,598,176 | Johnstone | May 27, 1952 |
| 2,646,999 | Borske | July 28, 1953 |